United States Patent [19]

Goodwin et al.

[11] Patent Number: 4,571,389
[45] Date of Patent: Feb. 18, 1986

[54] RICE HULL ASH COMPOSITIONS

[75] Inventors: John D. Goodwin, Shreveport; Forrest W. Mulkey, III, Plain Dealing, both of La.

[73] Assignee: Molly Maguire, Inc., Shreveport, La.

[21] Appl. No.: 579,465

[22] Filed: Feb. 13, 1984

Related U.S. Application Data

[63] Continuation-in-part of Ser. No. 460,679, Jan. 24, 1983, Pat. No. 4,488,908.

[51] Int. Cl.[4] .................... C04B 21/00; C04B 31/02; C04B 35/14
[52] U.S. Cl. ........................................ 501/85; 106/75; 501/133; 501/154
[58] Field of Search ...................... 106/75; 501/84, 85, 501/133, 154

[56] References Cited

U.S. PATENT DOCUMENTS 4,203,773  5/1980  Temple et al. .................. 501/85
4,308,065 12/1981  Wall-Muycelo .................. 106/75

Primary Examiner—Mark L. Bell
Attorney, Agent, or Firm—Serle Ian Mosoff

[57] ABSTRACT

Disclosed is a lightweight silicate aggregate produced by the steps of mixing together dry rice hull ash, an alkali metal hydroxide, boric acid, and water; heating the mixture to a temperature sufficient to initiate reaction; curing the composition at a temperature less than the boiling point of water until the reaction is complete; comminuting the cured product and heating the comminuted product to form the expanded aggregate. The expanded aggregate is useful as, inter alia, a sorbent, filler, energy insulator or filter.

7 Claims, No Drawings

RICE HULL ASH COMPOSITIONS

BACKGROUND OF THE INVENTOR

Related Application

This application is a continuation-in-part of application Ser. No. 06/460,679 filed Jan. 24, 1983, now U.S. Pat. No. 4,488,908.

Field of the Invention

The present invention relates to the production of lightweight expanded silicate aggregates, and more particularly to a method of preparing a lightweight expanded silicate aggregate from rice hull ash.

Description of the Prior Art

The production of lightweight silicate materials by thermal expansion has been disclosed in the prior art. Such materials find use, among other things, as insulation and fire proofing material, aggregates used in the preparation of concrete, oil adsorbents, and additives for improving soil.

One method for producing a lightweight silicate aggregate is disclosed in Temple et al, U.S. Pat. No. 4,203,773. In general, the process of the Temple et al patent includes the steps of mixing finely divided anhydrous alkali metal silicate with a boron-containing curing agent and water until a homogenous, free flowing powdery composition is attained. The powdery composition is cured to a temperature below about 100° C. until the silicate is hydrated. The hydrated composition is then comminuted and expanded by rapid heating to at least 425° C. to produce the lightweight aggregate. The starting material, i.e. an anhydrous alkali metal silicate, is a highly refined, pure product.

Walls-Muycelo, U.S. Pat. No. 4,308,065 discloses another process for making particulate lightweight porous aggregates. The process of the Walls-Muycelo patent includes preparing an aqueous paste of an alkali metal hydroxide with a mineral containing aluminum oxide, silicon dioxide in mineral form, boric oxide, a volatile material, and an aggregate modifier. The acqueous paste is stirred and the temperature is allowed to be autogenously increased to a temperature of between 70° C. and 80° C. The stirring is discontinued when the temperature remains unaltered for a short period of time and the paste turns into a reaction mass. The reaction mass is dried at a temperature of about 300° C. and then crushed and fired to produce the expanded aggregate.

Additional processes for preparing expanded lightweight silicate aggregates are disclosed in U.S. Pat. Nos. 3,719,510; 3,743,601; 3,765,919; 4,080,187; 3,756,839; 3,728,208; and 3,663,249. In the processes of all of the foregoing patents, the starting materials include pure alkali metal silicates.

Commercially, alkali metal silicates are manufactured by heating a mixture of an alkali compound and silica at about 2700° F. until a technically homogeneous glass is formed, then cooling the alkali metal silicate glass ("water glass") or quenching and dissolving it in water. Alkali metal silicates for general commercial use are manufactured with ratios of $SiO_2$ to $R_2O (R=Na,K,Li,Rb,Cs)$ ranging from 1:1 to 3.75:1, while higher ratios up to 5:1 are less readily dissolved in water, hence of lesser commercial interest.

It is known that rice hulls contain silica. In Blardone, U.S. Pat. No. 1,293,008, there is disclosed a process for extracting silica from rice hulls. For example, Blardone discloses that a concentrated solution of sodium silicate may be extracted from rice hulls by boiling together for a period of from one-half hour to several hours a mixture of 4 or 5 parts by weight of burned rice hulls with 10 parts of water and 1 part of sodium hydroxide. After such period of boiling, the mixture is filtered, with the mass remaining in the filter being washed with water and the filtrate, which is a solution of sodium silicate, being concentrated to the desired degree by further boiling. Another process disclosed by the Blardone patent includes the steps of fusing together 3 or 4 parts of burned rice hulls and 1 part of sodium carbonate, or 8 or 10 parts of burned rice hulls and 3 parts of sodium sulfate. The fused product is then treated with water to extract the sodium silicate, filtered, and the filtrate is evaporated to the required density.

Another patent, which makes use of the fact that rice hulls contain silica is Bieler et al U.S. Pat. No. 3,511,601, which discloses a process for densifying rice hulls. The process of the Bieler et al patent includes coating the rice hulls with an aqueous solution of an alkali metal hydroxide and then burning the coated rice hulls.

It is an object of the present invention to provide a lightweight silicate aggregate prepared from rice hulls without first forming substantially pure alkali metal silicate.

It is affurther object of this invention to provide a sorbent for liquids.

It is another object to provide a thermal and acoustic insulating material.

Yet another object is to provide a low cost material which may be used as a refractory, a filler, an energy attenuator, a soil conditioner or as a filter medium.

SUMMARY OF THE INVENTION

Briefly stated, the foregoing and other objects are accomplished by the process of the present invention. The process includes mixing dry rice hull ash, an alkali metal hydroxide, boric acid, and water. The mixture is heated to initiate reaction after which the mixture is cured at a temperature less than the boiling temperature of water until it forms a solid friable mass. The friable mass is comminuted into discrete particles which are expanded by rapid heating to form the expanded silicate aggregate. The aggregate may be used in many different applications as more fully described hereinbelow.

DESCRIPTION OF THE PREFERRED EMBODIMENT

A lightweight expanded silicate aggregate is prepared according to the present invention from dry rice hull ash. Rice hulls are a waste product from rice mills and are normally considered to be of little value. The rice hulls are normally burned at or near the mill and the ash is disposed of. It has been found that by the process of the present invention, rice hull ash can be made into a lightweight expanded silicate aggregate for less than half the cost, on a raw material basis, than that of a lightweight expanded silicate aggregate prepared from anhydrous sodium silicate glass.

Dry rice hulls are known to contain about 20% $SiO_2$, with the remaining composition being primarily cellulose and minor amounts of other combustible materials. When the rice hulls are incinerated, however, to burn the combustible material, the remaining rice hull ash contains in excess of 95% $SiO_2$. It has been found that the rice hull ash used in the process of the present invention should be well burned and should contain less than about 4% by weight of carbon. It has been found that if the carbon content of the ash is higher than about 4%, then the aggregate will not expand satisfactorily.

In the broadest aspect of the invention, the rice hull ash is mixed with an alkali metal hydroxide, boric acid, and water to form a slightly damp powdery composition. More particularly, the dry rice hull ash is mixed in the range of 45% to 70% by weight with 10% to 25% by weight of an alkali metal hydroxide, preferably selected from the group consisting of sodium hydroxide and potassium hydroxide, 10% to 25% by weight of water, and 2% to 4% by weight of boric acid. More preferably, the dry rice hull ash is mixed in the range of 56%–60% by weight with 15%–20% sodium hydroxide, 15%–20% water, and 2%–3% boric acid. In the most preferred embodiment, 62.1% dry rice hull ash and 2.5% boric acid are mixed together with 35.2% by weight of a 50% sodium hydroxide solution.

Preferably, the dry rice hull ash and boric acid are mixed together in dry form in a mixer to which is added a solution formed from the water and the alkali metal hydroxide. The solution of water and alkali metal hydroxide may either be commercially obtained aqueous solution or may be prepared by mixing the dry alkali metal hydroxide with water on site.

The temperature necessary to initiate reaction is about 160°. The necessary reaction temperature may be achieved either by mixing the dry rice hull ash, boric acid, and alkali metal hydroxide solution all at room temperature and then heating in, for example, an oven until the necessary reaction temperature of 160° is reached. Alternatively, the alkali metal hydroxide solution may be heated to a temperature in excess of 160° F. prior to addition to the dry rice hull ash and boric acid. When the heated alkali metal hydroxide solution is added, the reaction proceeds substantially spontaneously. Additionally, when the alkali metal hydroxide solution is prepared on site, the heat of solution when the alkali metal hydroxide and water are mixed is sufficient to elevate the temperature of the solution above 160° F. when the freshly mixed alkali metal hydroxide and water solution is added to the dry rice hull ash and boric acid components the reaction proceeds spontaneously. A minor amount of a silicone fluid emulsion may be added to the mixture prior to reaction. It has been found that the silicone causes the finished material not to absorb water from the air, which is a useful characteristic of the product when used as an insulation.

After the reaction has initiated, the composition is cured until the reaction is complete. The curing may take place either in room temperature or in an elevated temperature oven having a temperature less than the boiling temperature of water. The reaction is in most cases substantially complete in between 30 minutes and 2 hours; however, it has been found that the composition is completely cured in about 24 hours when cured in an oven at 160° F. or in about 48 hours when cured at room temperature.

After the composition has been cured, it forms a solid brittle friable mass. The mass may be broken up by crushing or grinding to form suitably sized discrete particles. Preferably, the particle size is between 8 and 20 mesh. After the particles have been formed, they are expanded in a furnace, or a like, at a temperature of, preferably, between 800° F. and 1000° F. The resulting product is a lightweight material that is insoluble in water, acids, and bases.

The cured composition may be shipped in its unexpanded form to save shipping costs due to the high volume of the expanded material. The cured composition may also be stored in the unexpanded form saving warehouse space until it is needed for current production.

After expansion, the composition has a wide range of uses. Many of the uses fall within the category of thermal or acoustic insulation. Another category of uses is as a solvent for various materials. Yet another category of uses is as an aggregate in an aggregate-binder system for building panels. The composition may also be used as a refractory, a filler for other materials, an energy attenuator, soil conditioner or filter medium. It will be apparent that the composition will have many other uses as well.

The composition has high thermal and acoustic energy insulation properties. The composition can be used as a loose fill insulation material or it may be combined with a binder system in a sprayable system.

The composition has been found to be particularily useful as a sorbent for animal wastes. It is particularily useful in litterboxes for domestic pets, in particuiar dogs, cats and domesticated rodents. Its usefulness may be enhanced in these applications by the addition of odor-covering or odor-reducing additives.

The use of silicones or other hydrophobic additives modifies the differential water absorbing/oil absorbing behavior of the composition and allows it to be advantageously used to separate the components of a water/oil system.

The silicone fluid used is preferably an emulsified siloxane fluid. The most preferred silicone emulsion is General Electric SM2140, which is a silicone emulsion formulated with a 10,000 centistoke polydimethyl siloxane fluid. The product can be diluted with water and presents no known fire hazard. It has low toxicity and has no objectionable odors.

The following examples serve to illustrate the practice of the invention.

EXAMPLE 1

79 parts by weight of dry rice hull ash and 4 parts by weight of boric acid were mixed in a dry mixer. 56 parts by weight of a commercially obtained 50% by weight solution of sodium hydroxide to which 2% by weight of the sodium hydroxide solution of a 50% silicone emulsion were added were heated to 180° F. The heated solution was added to the dry rice hull ash the boric acid mixture and mixed together to form a damp powdery composition. The damp powdery composition was placed in a tub on the floor at room temperature and allowed to cure for 48 hours. After curing, the composition formed a brittle mass which was broken up into particles between 8 and 20 mesh in size. The particles were expanded in a furnace at about 1000° F. The product obtained had a bulk density of 5.804 pounds per cubic foot. The material was insoluble in water, mineral acid, and base and had a pH of 10.4. The material was placed in boiling water and showed no signs of disintegration. Thus, the product of Example 1 was deemed acceptable.

EXAMPLE 2

The procedure of Example 1 was generally repeated except that the 56 parts of the 50% sodium hydroxide solution was added to the mixture of 79 parts dry rice hull ash and 4 parts boric acid at room temperature and the resulting composition was placed in a drying oven at 160° F. for 24 hours during which reaction and curing occurred. The cured composition again was comminuted and expanded. The bulk density of the expanded product of Example 2 was 5.736 pounds per cubic foot. Again, the product was insoluble in water, mineral acids, and bases, and passed the boil test.

EXAMPLE 3

In this example, 1.0 parts of dry rice hull ash, 0.035 parts of CaO, and 0.035 parts of boric acid were mixed together in dry form in a mixer. A sodium hydroxide solution was formed by combining, 0.376 parts of anhydrous sodium hydroxide with 0.215 parts of water, with the addition of 2 percent by weight of the sodium hydroxide and water of the silicone fluid. The heat of solution of the sodium hydroxide in the water caused the solution to attain a temperature of 190° F. The hot solution was added to the dry mixture of rice hull ash, calcium oxide, and boric acid and was placed in a drying oven at 160° F. for 24 hours to cure. The cured composition was comminuted and expanded to achieve a bulk density of 6.276 pounds per cubic foot. The expanded product was insoluble in water, mineral acid, and base, and was not subject to disintegration during boiling.

EXAMPLE 4

In this example, the procedure of Example 3 was generally repeated except that the composition formed by mixing the dry rice hull ash, calcium oxide, and boric acid, with the solution formed from anhydrous sodium hydroxide, water, and silicone fluid, was allowed to cure at room temperature for 24 hours, whereupon the cured material was comminuted and expanded. The expanded product had a bulk density of 10.6 pounds per cubic foot, which indicated that the product was not completely cured. However, the expanded product was insoluble in water, mineral acid, and bases, and did not disintegrate when boiled.

EXAMPLE 5

In this example, the process of Example 2 was generally repeated except that the amount of dry rice hull ash was increased by 25%. More specifically, 98.75 parts of dry rice hull ash were mixed with 4 parts of boric acid in a dry mixer. To the dry rice hull ash and boric acid was added 56 parts of 50% sodium hydroxide solution with 3% silicone fluid at room temperature. The resulting composition was placed in an oven at 160° F. for 24 hours, during which time the composition reacted and cured. After curing, the composition was comminuted and expanded. The expanded material had a bulk density of 2.838 pounds per cubic foot, was insoluble, and did not disintegrate when boiled in water.

EXAMPLE 6

In this example, the product was prepared according to the process set forth in Example 5 except that the boric acid was omitted and 3 parts by weight of calcium oxide were included. Thus, in this example, 98.75 parts by weight of dry rice hull ash were mixed with 3 parts by weight of calcium oxide. 56 parts by weight of the 50% sodium hydroxide solution with 3% by weight thereof of silicone fluid were added to the dry rice hull ash and lime at room temperature. The resulting mixture was cured in an oven at 160° F. for 24 hours. The product was then comminuted and expanded. The expanded product had a satisfactory bulk density of 6.000 pounds per cubic foot but disintegrated when boiled in water. Accordingly, the product prepared without boric acid was deemed to be unacceptable.

EXAMPLE 7

In this example, the product was prepared according to the method of Example 6 except that the calcium oxide was omitted. Thus, 98.75 parts by weight of dry rice hull ash were mixed with 56 parts by weight of a 50% sodium hydroxide solution with 3% silicone at room temperature. The mixture was cured in an oven at 160° F. for 24 hours and comminuted and expanded. The expanded product had a very low bulk density of 3.324 pounds per cubic foot but, again disintegrated when boiled in water. Thus, while an expanded product may be obtained without boric acid, such product is not acceptable.

EXAMPLE 8

In this example, 98.75 parts by weight of dry rice hull ash were mixed in a dry mixer with 3 parts by weight of calcium oxide and 4 parts by weight of boric acid. To the dry mixture was added 56 parts by weight of 50% sodium hydroxide solution with 2% silicone fluid at room temperature. The resulting mixture was placed in an oven for 24 hours at 160° F., during which time reaction and curing occurred. After curing, the product was comminuted and expanded. The expanded product had a bulk density of 7.008 pounds per cubic foot, was insoluble, and did not disintegrate when boiled.

EXAMPLE 9

In this example, the process of Example 2 was generally repeated, except that the amount of dry rice hull ash was increased by 50%. Thus, 118.5 parts of dry rice hull ash were mixed in a dry mixer with 3 parts by weight of lime and 4 parts by weight of boric acid. To the dry mixture was added 56 parts by weight of 50% sodium hydroxide solution with 2% silicone fluid at room temperature. The resulting composition was then placed in an oven at 160° F. for 24 hours, during which time reaction and curing occurred. The cured product was comminuted and expanded. The expanded material had a bulk density of 9.300 pounds per cubic foot and did not disintegrate when boiled.

EXAMPLE 10

In this example, the amounts of dry rice hull ash was increased by 75% over that of Example 2. More specifically, 138.25 parts by weight of dry rice hull ash were mixed in a dry mixer with 3 parts by weight of lime and 4 parts by weight boric acid. To the dry mixture was added 56 parts by weight of 50% sodium hydroxide solution with 2% silicone fluid. Again, the resulting mixture was placed in an oven at 160° F. for 24 hours for reaction and curing. The cured product was comminuted and expanded. The expanded product had a bulk density of 12.972 pounds per cubic foot and did not disintegrate when boiled.

EXAMPLE 11

In this example, the amount of dry rice hull ash was decreased by 25% compared to Example 2. Thus, 59.25 parts by weight of dry rice hull ash were mixed in a dry mixer with 3 parts by weight of lime and 4 parts by weight of boric acid. 56 parts by weight of 50% sodium hydroxide solution with 2% silicone fluid were added at room temperature. The resulting mixture was placed in an oven at 160° F. for 24 hours for curing and drying. The cured product was comminuted and expanded. The expanded product had a bulk density of 12.14 per cubic foot and did not disintegrate when boiled. However, the expansion was deemed to be poor due to the wetness of the cured product.

EXAMPLE 12

In this example, urea was added to the sodium hydroxide solution prior to mixing with the dry components. Thus, 79 parts by weight of dry rice hull ash were mixed with 3 parts by weight of lime and 4 parts by weight of boric acid. 4 parts by weight of urea was added to 56 parts by weight of 50% sodium hydroxide solution with 2% silicone fluid and mixed with the dry ingredients. The resulting composition was placed in an oven at 160° F. for 24 hours for reaction and curing. The cured material was comminuted and expanded to achieve a bulk density of 7.581 pounds per cubic foot which did not disintegrate when boiled.

EXAMPLE 13

In this example, the sodium hydroxide solution was prepared by mixing water with anhydrous sodium hydroxide, urea, and the silicone fluid. Thus, 1 part by weight dry rice hull ash was mixed with 0.035 parts by weight of lime and 0.035 parts by weight of boric acid. The sodium hydroxide solution was formed by mixing 0.376 parts by weight of sodium hydroxide with 0.215 parts by weight of water and 0.035 parts by weight of urea, which in turn was mixed with 2% by weight of the solution of the silicone fluid. The heat of solution caused the solution to attain a temperature of 190° F. The sodium hydroxide solution was mixed with the dry components and the reaction was immediate. The composition was then cured for 24 hours in an oven at 160° F. The cured material was comminuted and expanded to attain a bulk density of 6.476 pounds per cubic foot and the expanded product did not disintegrate when boiled.

EXAMPLE 14

In this example, a product was prepared generally according to the method of Example 3, except, that potassium hydroxide was substitute for sodium hydroxide. Thus, 1 part of dry rice hull ash was mixed in a dry mixer with 0.035 parts boric acid and 0.035 parts lime. A solution was formed by mixing 0.376 parts by weight of potassium hydroxide with 0.215 parts by weight of water with the addition of 2% by weight of the solution of the silicone fluid. The heat of solution caused the solution to attain a temperature of 190° F. The hot solution was mixed the dry components, which initiated an immediate reaction. The resulting mixture was cured for 24 hours in an oven at 160° F. The cured product was comminuted and expanded with a bulk density of 12.0 pounds per cubic foot. The expanded material did not disintegrate when boiled.

EXAMPLE 15

In this example, the product was prepared according to the process in Example 14, except that the silicone fluid was omitted. The expanded product had a bulk density of 15 pounds per cubic foot and did not disintegrate when boiled.

We claim:
1. A rice hull ash composition comprising
 (a) from about 45% to about 70% by weight of substantially water free rice hull ash which contains no more than about 4% carbon;
 (b) from about 10% to about 25% of an alkali metal hydroxide;
 (c) from about 2% to about 4% boric acid; and
 (d) from about 10% to about 25% by weight of water.
2. The composition of claim 1 wherein the ash is from about 56% to about 60% by weight of the composition; the alkali metal hydroxide is from about 15% to about 20% by weight; the boric acid is from about 2% to about 3% by weight: and the water is from about 15% to about 20% by weight of the composition.
3. The composition of claim 1 wherein the ash is 62.% by weight of the composition; the alkali metal hydroxide is about 17.6% by weight; the boric acid is about 2.5% by weight; and the water is about 17.6% by weight of the composition.
4. A solidified rice hull ash prepared by heating
 a. from about 45% to about 70% by weight of substantially water free rice hull ash which contains no more than about 4% carbon;
 b. from about 10% to about 25% of an alkali metal hydroxide;
 c. from about 2% to about 4% boric acid; and
 d. from about 10% to about 25% by weight of water to a temperature of between about 70° C. and about 98° C. and maintaining the temperature in such range until the mixture forms a solid mass.
5. The solidified rice hull ash of claim 4 wherein
 a. the rice hull ash is from about 56% to about 60% by weight;
 b. the alkali metal hydroxide is from about 15% to about 20% by weight;
 c. the boric acid is from about 2% to about 3% by weight;
 d. the water is from about 15% to about 20% by weight of the composition prior to heating.
6. An expanded rice hull ash composition prepared by heating a mixture comprising
 a. from about 45% to about 70% by weight of substantially water free rice hull ash which contains no more than about 4% carbon;
 b. from about 10% to about 25% of an alkali metal hydroxide;
 c. from about 2% to about 4% boric acid; and
 d. from about 10% to about 25% by weight of water to a temperature of between about 70° C. and about 98° C. and maintaining the temperature in such range until the mixture becomes a solid mass, comminuting the solidified mass into discrete particles and expanding the discrete particles by rapid heating.
7. The expanded rice hull ash composition of claim 6 wherein
 a. the rice hull ash is from about 56% to about 60% by weight;
 b. the alkali metal hydroxide is from about 15% to about 20% by weight;
 c. the boric acid is from about 2% to about 3% by weight;
 d. the water is from about 15% to about 20% by weight of the composition prior to heating.

* * * * *